(12) United States Patent
Fujita et al.

(10) Patent No.: US 10,161,489 B2
(45) Date of Patent: Dec. 25, 2018

(54) FRICTION-ROLLER-TYPE REDUCTION GEAR

(71) Applicant: NSK LTD., Tokyo (JP)

(72) Inventors: Ryosuke Fujita, Fujisawa (JP); Hiroshi Kawahara, Fujisawa (JP); Hiroyasu Yoshioka, Fujisawa (JP)

(73) Assignee: NSK LTD., Tokyo (JP)

( * ) Notice: Subject to any disclaimer, the term of this patent is extended or adjusted under 35 U.S.C. 154(b) by 23 days.

(21) Appl. No.: 15/527,894

(22) PCT Filed: Apr. 12, 2016

(86) PCT No.: PCT/JP2016/061842
§ 371 (c)(1),
(2) Date: May 18, 2017

(87) PCT Pub. No.: WO2016/167261
PCT Pub. Date: Oct. 20, 2016

(65) Prior Publication Data
US 2018/0172118 A1 Jun. 21, 2018

(30) Foreign Application Priority Data

Apr. 13, 2015 (JP) ................................. 2015-081888
Jul. 6, 2015 (JP) ................................. 2015-135442
Mar. 18, 2016 (JP) ................................. 2016-055717

(51) Int. Cl.
*F16H 13/08* (2006.01)
*F16H 13/14* (2006.01)
*F16H 13/06* (2006.01)

(52) U.S. Cl.
CPC ............ *F16H 13/14* (2013.01); *F16H 13/06* (2013.01); *F16H 13/08* (2013.01)

(58) Field of Classification Search
None
See application file for complete search history.

(56) References Cited

U.S. PATENT DOCUMENTS 1,368,570 A * 2/1921 Philippeau ............ F16H 13/06
475/183
3,292,460 A 12/1966 Fritsch
(Continued)

FOREIGN PATENT DOCUMENTS

| JP | 11-502596 A | 3/1999 |
| JP | 2013-104545 A | 5/2013 |
| JP | 2014-190536 A | 10/2014 |

OTHER PUBLICATIONS

International Search Report, issued by International Searching Authority in corresponding International Application No. PCT/JP2016/061842, dated May 24, 2016, (PCT/ISA/210).
(Continued)

*Primary Examiner* — Justin Holmes
(74) *Attorney, Agent, or Firm* — Sughrue Mion, PLLC

(57) ABSTRACT

A pivot holder of a friction-roller-type reduction gear has a pair of bearing parts configured to support a rotational shaft of an intermediate roller and having a pivot axis at an eccentric position from a center of the rotational shaft, and a bridging part configured to integrally couple the pair of bearing parts. A carrier has a holder support part configured to rotatably support the bearing parts. An interaxial distance between a center of the pivot axis and the center of the rotational shaft is equal to or smaller than a maximum radius of an outer diameter of the intermediate roller, and the center of the pivot axis is located on an applying line of a torque reaction force of transmission torque to be applied to the pivot holder.

4 Claims, 16 Drawing Sheets

(56) References Cited

U.S. PATENT DOCUMENTS

| | | | | |
|---|---|---|---|---|
| 3,364,761 | A | * | 1/1968 | Nasvytis ................. F16H 13/14 |
| | | | | 475/195 |
| 3,487,705 | A | | 1/1970 | Fox |
| 5,720,689 | A | * | 2/1998 | Imanishi ................. F16C 19/30 |
| | | | | 384/455 |
| 6,039,668 | A | | 3/2000 | Kolstrup |
| 6,132,330 | A | * | 10/2000 | Leggett ................... F16H 47/04 |
| | | | | 475/331 |
| 2005/0137046 | A1 | * | 6/2005 | Miller ................. B62D 5/0409 |
| | | | | 475/214 |

OTHER PUBLICATIONS

Written Opinion, issued by International Searching Authority in corresponding International Application No. PCT/JP2016/061842, dated on May 24, 2016, (PCT/ISA/237).
Communication dated Apr. 11, 2018, issued by the European Patent Office in counterpart European application No. 16780052.3.

* cited by examiner

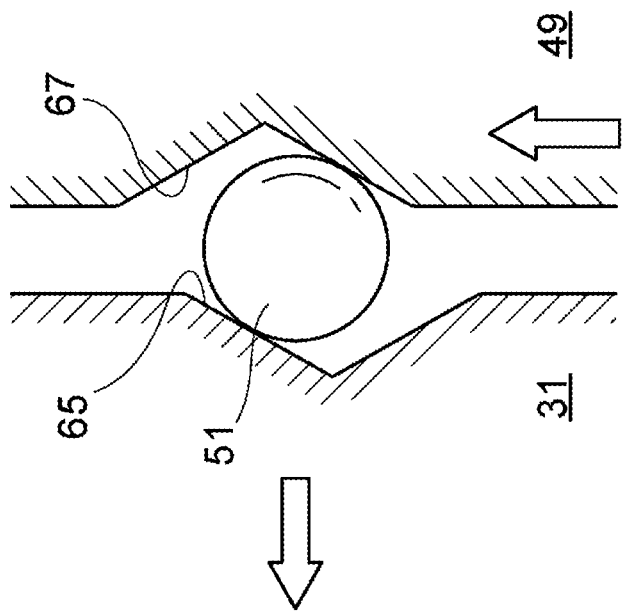
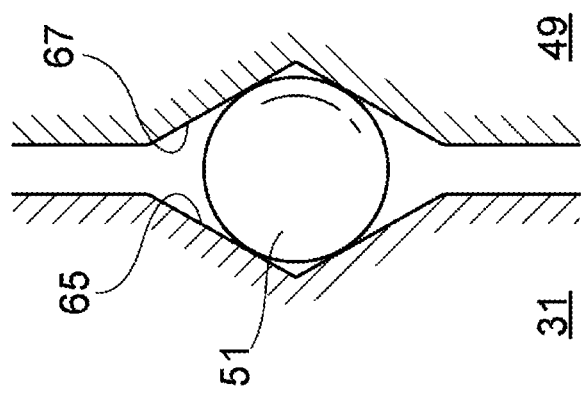

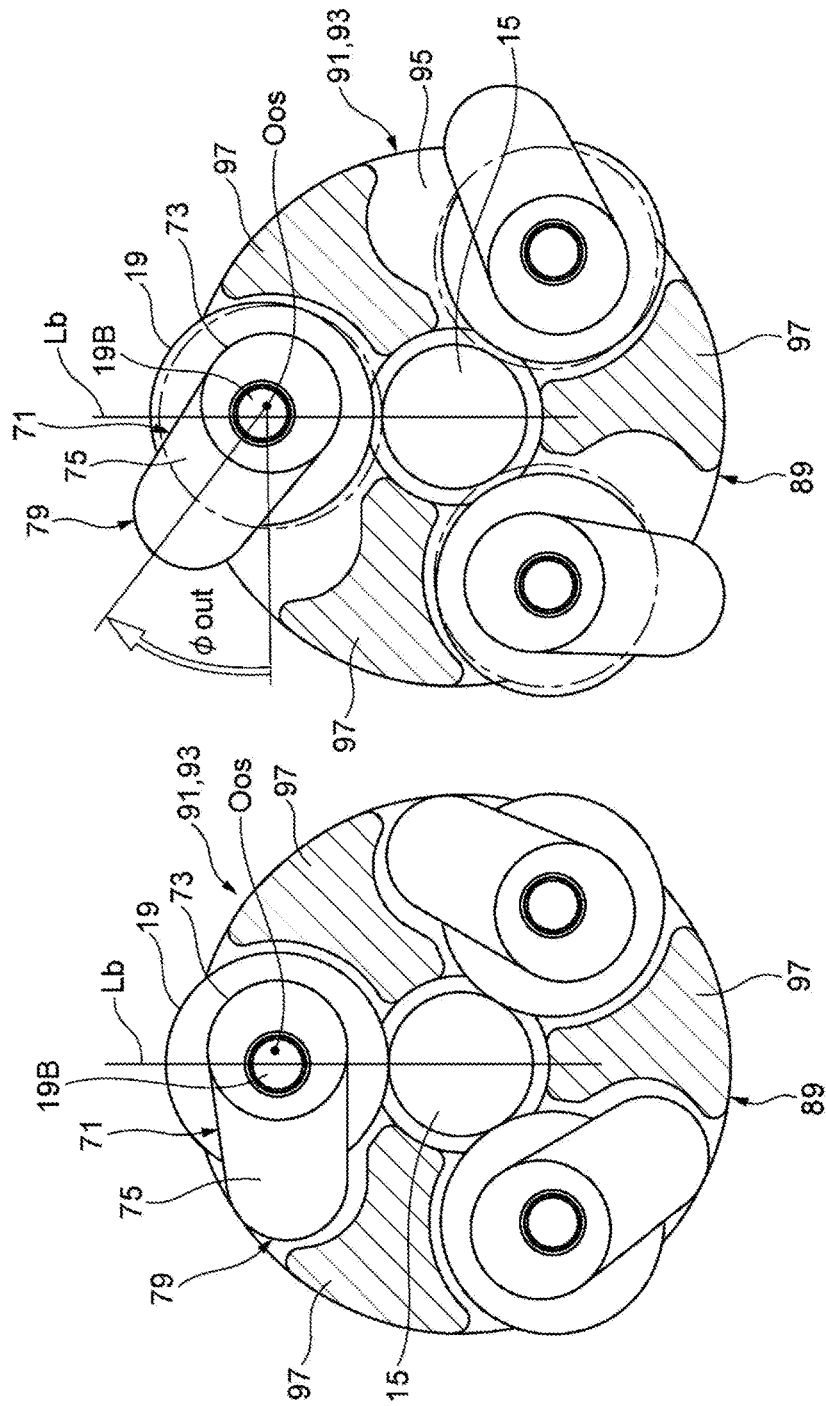

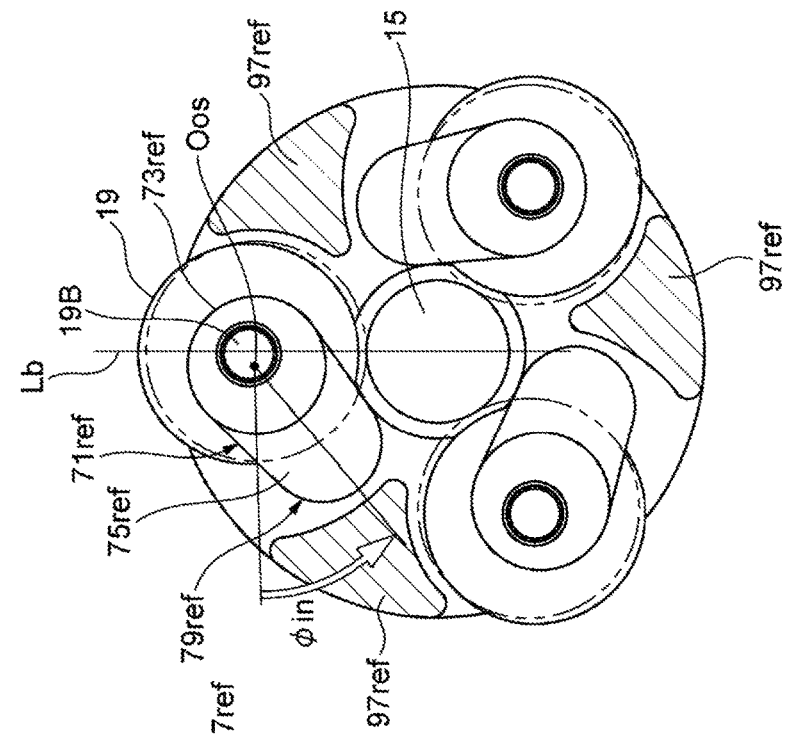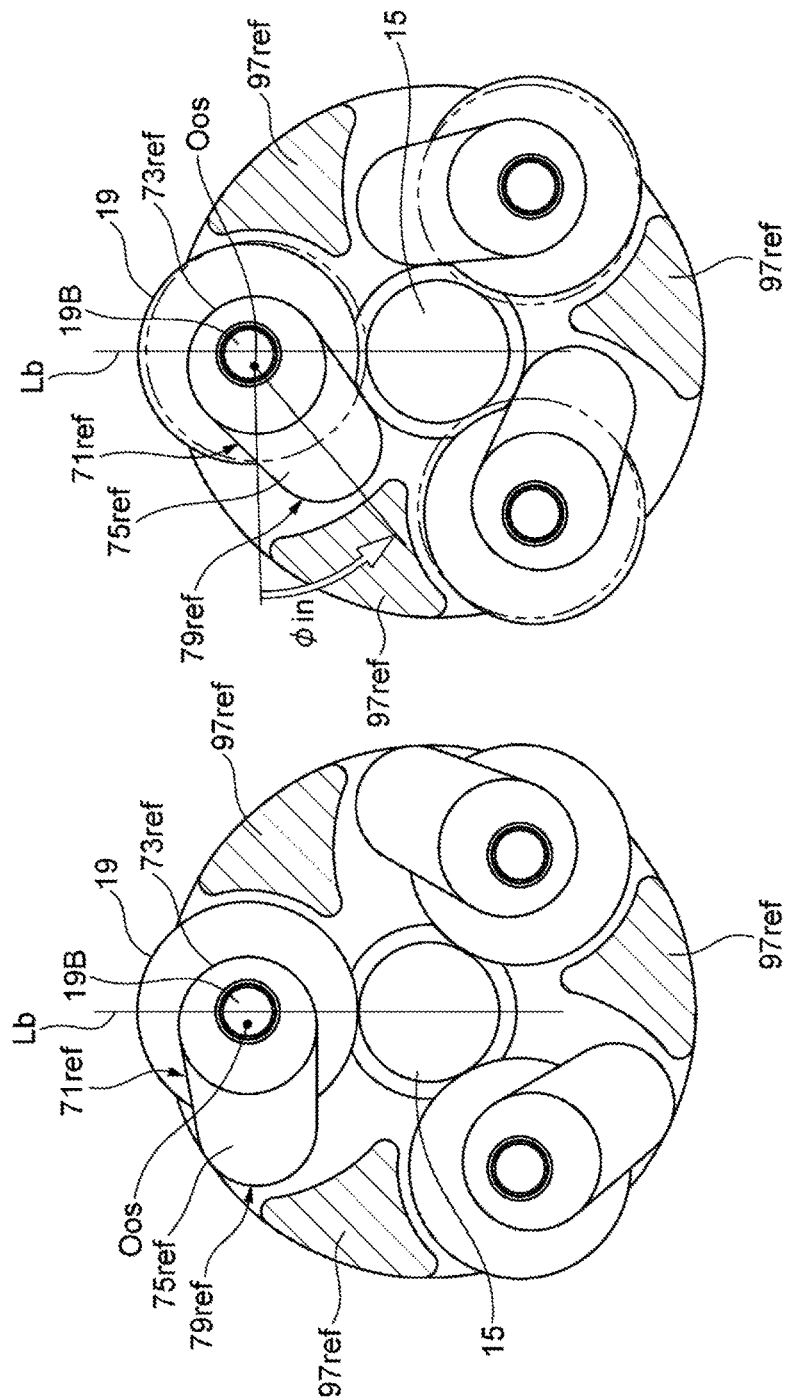

FRICTION-ROLLER-TYPE REDUCTION GEAR

TECHNICAL FIELD

The present invention relates to a friction-roller-type reduction gear.

RELATED ART

Regarding an electric automobile, a hybrid automobile, an electric four-wheel-drive vehicle and the like that have been recently spread, needs for improving efficiency of an electric motor to prolong a mileage per one charging so as to improve the convenience increase. In order to increase the efficiency of the electric motor, it is preferably to use a small-sized electric motor configured to rotate at high speed, to decelerate rotation of a motor output shaft and then to transmit the rotation to driving wheels of a vehicle. In this case, an operation speed of a reduction gear connected to the motor output shaft considerably increases, so that vibrations and noises are likely to occur.

Therefore, it is considered to use a friction-roller-type reduction gear so as to suppress the vibrations and noises upon the operation. An example of the friction-roller-type reduction gear of the related art is disclosed in Patent Document 1. The friction-roller-type reduction gear has a sun roller, a ring roller arranged concentrically with the sun roller, and a plurality of intermediate rollers rotatably supported between an outer peripheral surface of the sun roller and an inner peripheral surface of the ring roller. The sun roller has a pair of sun roller elements. One sun roller element comes close to or separates from the other sun roller element in response to transmission torque, thereby changing respective surface pressures of the sun roller elements, the intermediate rollers and the ring roller.

As shown in FIG. 15, intermediate rollers 315 arranged between a sun roller 311 and a ring roller 313 are pivotally supported to pivot holders 319 configured to pivot about pivot axes 317. The pivot holders 319 pivot about the pivot axes 317, so that roller outer peripheral surfaces of the intermediate rollers 315 can protrude radially outward.

CITATION LIST

Patent Documents

Patent Document 1: Japanese Patent Application Publication No. 2013-104545A

SUMMARY OF THE INVENTION

Problems to be Solved

In the above friction-roller-type reduction gear of the related art, a line $L_0$ connecting the pivot axis 317 of the pivot holder 319 and a support shaft 321 of the intermediate roller 315 is inclined relative to a tangential line $L_a$ at a contact point $P_a$ with the sun roller 311. For this reason, when a tangential force F1 or F2 is applied to the support shaft 321 of the intermediate roller 315 upon acceleration/deceleration of the reduction gear, component forces of the tangential force are applied to a traction surface of the intermediate roller 315. Thereby, contact surface pressures may be unequal between the contact point $P_a$ with the sun roller 311 and a contact point $P_b$ with the ring roller 313. In this case, the durability of the reduction gear may be lowered and a slip may be caused.

Also, since directions of the component forces are changed by a direction of a torque reaction force to be applied to the pivot holder 319, characteristics of the reduction gear are changed by operation conditions of the reduction gear such as a torque transmission direction.

In order to prevent the above situation, it is necessary to make the line $L_0$ and the tangential line $L_a$ parallel with each other. However, such arrangement may cause interference between an arm part of the pivot holder 319 and the ring roller 313 depending on a size of each roller, so that a layout of the rollers cannot be made.

Therefore, as shown in FIG. 16, it is considered to arrange a pivot axis 325 at an eccentric position from a roller rotation axis 323 with respect to a pair of bearing parts 322 configured to support the intermediate roller 315. That is, outer peripheral surfaces of the bearing parts 322 having a circular axial section are rotatably inserted into respective shaft holes 330 formed in frames 331, 333, and central axes of the outer peripheral surfaces of the bearing parts 322 are set as the pivot axis 325. Also, the bearing part 322 is configured to support the support shaft 321 of the intermediate roller 315 at an eccentric position from the pivot axis 325.

According to the above structure, since it is possible to lay out the pivot axis 325 at a side surface 315a-side of the intermediate roller 315, it is possible to arrange the pivot axis 325 on the tangential line $L_a$.

However, according to the structure shown in FIG. 16, since the pivoting occurs at each of the bearing parts 322, 322 positioned at both axial sides of the intermediate roller 315, relative distortion occurs at the bearing parts 322, 322. As a result, tilt that the intermediate roller 315 is inclined occurs and the slip increases in a contact ellipse on the traction surface, so that power transmission efficiency is lowered. In the meantime, herein, the tilt means that the roller is inclined in a plane configured by the sun roller rotation axis and the intermediate roller rotation axis.

The present invention has been made in view of the above situations, and an object of the present invention is to provide a friction-roller-type reduction gear capable of preventing tilt of intermediate rollers without applying a torque component force due to torque transmission of the reduction gear to the intermediate rollers and preventing surface pressures of respective contact points of the intermediate rollers, a sun roller and a ring roller from being unequal.

Means for Solving the Problems

The present invention is configured as follows.

(1) A friction-roller-type reduction gear including:
a sun roller arranged concentrically with an input shaft;
a ring roller arranged concentrically with the sun roller at an outer periphery-side of the sun roller and coupled to an output shaft;
a plurality of intermediate rollers configured to rolling-contact an outer peripheral surface of the sun roller and an inner peripheral surface of the ring roller;
a plurality of pivot holders each of which is provided for each of the plurality of intermediate rollers and is configured to support a rotational shaft of the intermediate roller;
a carrier configured to support the plurality of pivot holders, respectively, and
a loading cam mechanism configured to apply a pressing force, which is proportional to a magnitude of transmission torque to be applied to rolling-contact surfaces between respective rollers of the sun roller, the ring roller and the intermediate rollers, to the rolling-contact surfaces, wherein each of the pivot holders has:

a pair of bearing parts configured to support the rotational shaft of the intermediate roller and having a pivot center at an eccentric position from a center of the rotational shaft, and a bridging part configured to integrally couple the bearing parts, wherein the carrier has holder support parts configured to rotatably support the bearing parts, wherein an interaxial distance between the pivot center of the bearing part and the center of the rotational shaft is equal to or smaller than a maximum radius of an outer diameter of the intermediate roller, and wherein the pivot center is located on an applying line of a torque reaction force of transmission torque to be applied to the pivot holder.

According to the friction-roller-type reduction gear, since a torque component force resulting from the torque transmission is not generated, contact surface pressures of respective contact points of the intermediate rollers, the sun roller and the ring roller are not unequal and become stable. Also, it is possible to obtain stable power transmission characteristics, irrespective of operation conditions of the reduction gear such as a torque transmission direction.

(2) The friction-roller-type reduction gear according to the above (1), wherein the interaxial distance between the center of the pivot axis and the center of the rotational shaft is smaller than a length, which is to be obtained by subtracting a sum of an inner peripheral surface radius of the holder support part configured to support the rotational shaft and a radial minimum thickness of the bearing part from a radius of the intermediate roller.

According to the friction-roller-type reduction gear, it is possible to arrange the bearing parts with high space efficiency without interfering with the sun roller and the ring roller.

(3) The friction-roller-type reduction gear according to the above (1) or (2), wherein the bridging part is arranged over an outer peripheral surface of the intermediate roller from both end surfaces of the intermediate roller.

According to the friction-roller-type reduction gear, it is possible to suppress distortion, which is be generated at the bearing parts, with small force.

(4) The friction-roller-type reduction gear according to one of the above (1) to (3), wherein the rotational shaft of the intermediate roller is inserted into a shaft hole axially penetrating an inner diameter part, and wherein the bearing parts are respectively fixed to both end portions of the rotational shaft, so that the bridging part is configured.

According to the friction-roller-type reduction gear, since a space of the outer diameter-side of the intermediate roller is not required, the friction-roller-type reduction gear can be applied to a reduction gear having a large speed reduction ratio and a small clearance between the intermediate rollers, too.

Effects of the Invention

According to the present invention, it is possible to prevent the tilt of the intermediate rollers without applying a torque component force due to the torque transmission of the reduction gear to the intermediate rollers and to prevent the surface pressures of respective contact points of the intermediate rollers, the sun roller and the ring roller from being unequal.

BRIEF DESCRIPTION OF THE DRAWINGS

FIG. 4A is a sectional view taken along a line IV-IV of FIG. 3, depicting a state where the loading cam mechanism does not generate an axial thrust force, and FIG. 4B is a sectional view taken along a line IV-IV of FIG. 3, depicting a state where the loading cam mechanism generates an axial thrust force.

FIG. 10A is a sectional view depicting a relation between pillar parts of the carrier and bridging parts 79 of the pivot holders and illustrating a state where the intermediate rollers are in contact with a sun roller, and FIG. 10B is a sectional view depicting a relation between the pillar parts of the carrier and the bridging parts of the pivot holders and illustrating a state where the pivot holders are pivoted to move the intermediate rollers toward an outer diameter-side of the sun roller.

FIG. 11A is a reference view depicting a relation between pillar parts of the carrier and bridging parts of pivot holders and is a sectional view illustrating a state where the intermediate rollers are in contact with the sun roller, and FIG. 11B is a reference view depicting a relation between the pillar parts of the carrier and the bridging parts of the pivot holder and is a sectional view illustrating a state where the pivot holders are pivoted to move the intermediate rollers toward the outer diameter-side of the sun roller.

DETAILED DESCRIPTION OF EMBODIMENTS

<Basic Configuration of Friction-Roller-Type Reduction Gear>

Figure 1:
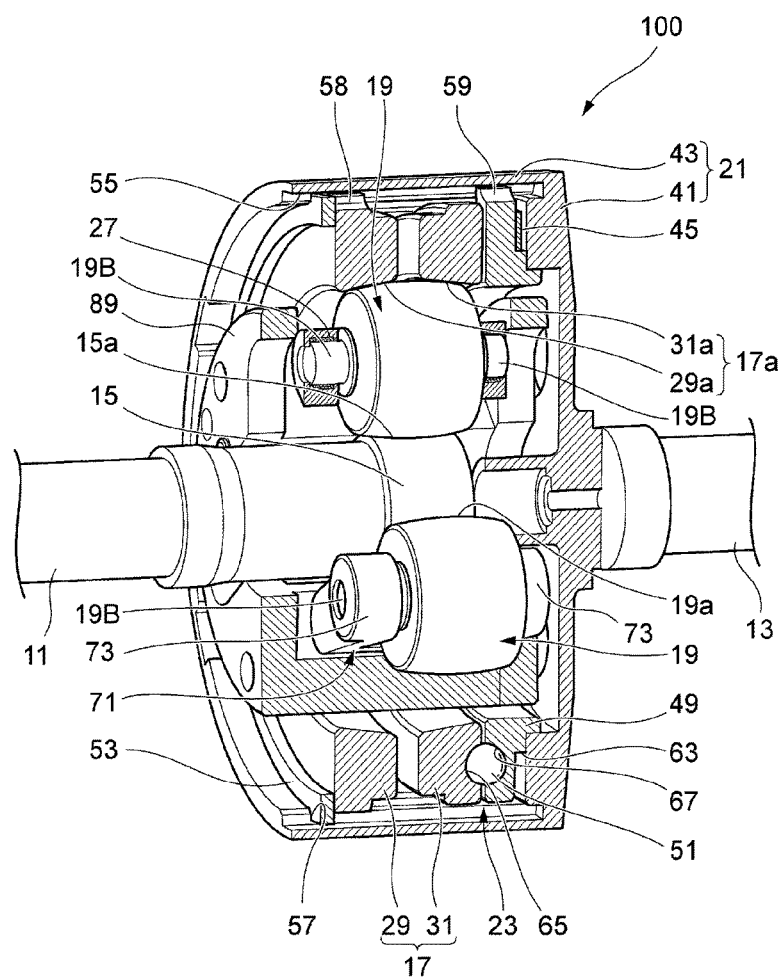
FIG. 1 is a partially sectional perspective view of a friction-roller-type reduction gear, illustrating an embodiment of the present invention.
Figure 2:
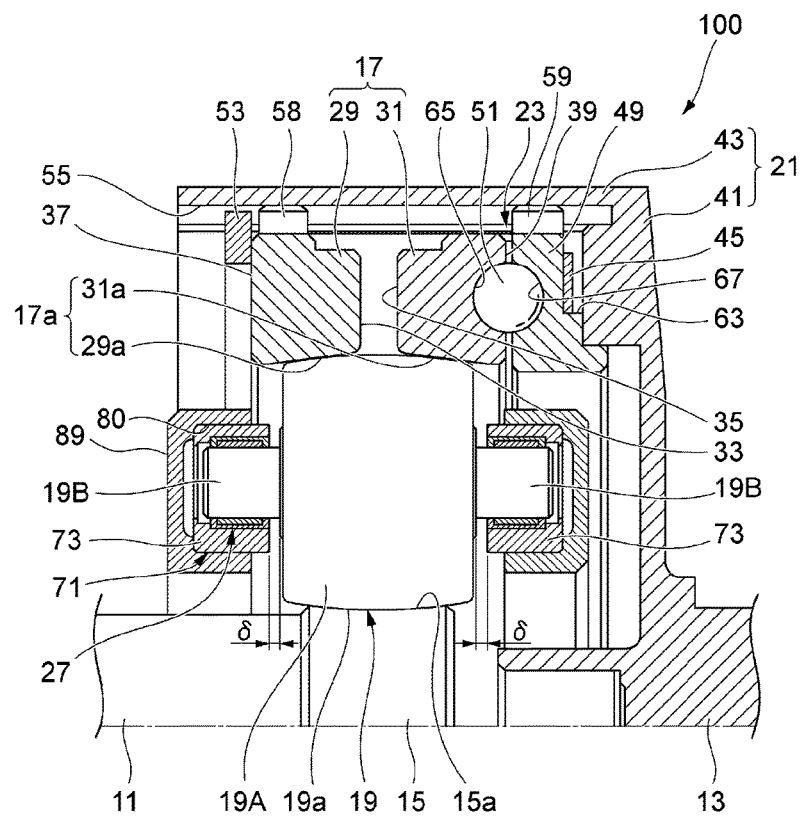
FIG. 2 is an enlarged sectional view of main parts of the friction-roller-type reduction gear shown in FIG. 1.

FIG. 1 is a partially sectional perspective view of a friction-roller-type reduction gear, illustrating an embodiment of the present invention, and FIG. 2 is an enlarged sectional view of main parts of the friction-roller-type reduction gear. As shown in FIGS. 1 and 2, a friction-roller-type reduction gear 100 is configured to decelerate and transmit rotation input from an input shaft 11 to an output shaft 13, the input shaft 11 and the output shaft 13 being concentrically arranged. The friction-roller-type reduction gear 100 has a sun roller 15 arranged concentrically with the input shaft 11, a ring roller 17, a plurality of intermediate rollers 19, a coupling part 21 configured to couple the ring roller 17 and the output shaft 13, and a loading cam mechanism 23.

Also, although described in detail later, the friction-roller-type reduction gear 100 has pivot holders 71 each of which is provided for each of the plurality of intermediate rollers 19 and is configured to rotatably support a pair of support shafts (rotational shafts) 19B, 19B of the intermediate roller 19, and a carrier 89 configured to support the pivot holders 71 so that each pivot holder can be pivotally displaceable about an eccentric position from the support shafts 19B, 19B, which is a pivot center.

The pivot holder 71 has a pair of bearing parts 73 configured to respectively support the support shafts 19B, 19B. The bearing parts 73 are inserted into shaft holes formed in the carrier 89 and support the pivot holder 71 with respect to the carrier 89 to be pivotally displaceable. In the configuration, the pivot center of the pivot holder 71 is arranged in a region in an outer diameter of the bearing part 73, and the bearing parts 73, 73 are integrally coupled by a bridging part, which will be described later. Thereby, relative distortion of the bearing parts 73, 73 is suppressed.

Hereinafter, configurations of the respective parts of the friction-roller-type reduction gear 100 are sequentially described.

The sun roller 15 is a solid roller formed integrally with the input shaft 11 at one end of the input shaft 11 shown in FIG. 2. An outer peripheral surface 15a of the sun roller 15 is formed as a concave curved surface of which an outer edge shape of an axial section is a concave curve of a single arc shape.

The ring roller 17 has a pair of ring roller elements provided side by side in an axial direction, i.e., a fixed ring roller element 29 and a moveable ring roller element 31 configured to be freely moveable in the axial direction. Each of the ring roller elements 29, 31 is arranged concentrically with the sun roller 15 at an outer periphery-side of the sun roller 15 within the cup-shaped coupling part 21.

Inner peripheral surfaces 29a, 31a of the fixed ring roller element 29 and the moveable ring roller element 31 are configured as annular inclined surfaces of which an outer edge shape of an axial section is linear. The inclined surfaces are inclined surfaces of which distances to a center of rotation of the intermediate roller 19 gradually decrease from opposing end surfaces 33, 35 of the ring roller elements 29, 31 to axially opposite outer end surfaces 37, 39. The inclined surfaces become rolling-contact surfaces on which the intermediate roller 19 is to roll. In the meantime, the inner peripheral surfaces 29a, 31a are not limited to the inclined surfaces and may be concave curved surfaces of which an outer edge shape of an axial section is a concave curve of a single arc shape.

The plurality of intermediate rollers 19 is arranged in an annular space between the outer peripheral surface 15a of the sun roller 15 and an inner peripheral surface 17a of the ring roller 17.

An outer peripheral surface 19a of the intermediate roller 19 is a convex curved surface of which an outer edge shape of an axial section is a convex curve of a single arc shape.

The outer peripheral surface 19a becomes a traction surface configured to rolling-contact the outer peripheral surface 15a of the sun roller 15 and the inner peripheral surface 17a of the ring roller 17.

The coupling part 21 has a base end portion 41 having a substantially circular plate shape and coupled to the output shaft 13 at a central portion thereof and a cylindrical roller holding part 43 extending axially from an outer peripheral edge of the base end portion 41 and configured to hold the ring roller 17 and the like at an inner diameter-side thereof.

The base end portion 41 is formed by cutting processing such as lathe machining, for example, and the roller holding part 43 is formed by plastic forming such as press molding. Thereby, shaft centers of the base end portion 41 and the roller holding part 43 are matched with high precision at low cost.

As shown in FIG. 2, a preload spring 45 having a corrugated plate shape, a cam ring 49, a ball 51, which is a rolling element, the moveable ring roller element 31, the fixed ring roller element 29 and a snap ring 53 are arranged in corresponding order from the base end portion 41-side in the roller holding part 43.

An inner peripheral part of the roller holding part 43 is formed with concave grooves 55 along the axial direction. The concave grooves 55 are formed at a plurality of circumferential places of the inner peripheral part of the roller holding part 43. In the concave grooves 55, protrusions 58 formed at a plurality of places of an outer peripheral part of the fixed ring roller element 29 and protruding radially outward are respectively accommodated.

The cam ring 49 has a plurality of protrusions 59 protruding radially outward from an outer peripheral part thereof. The protrusions 59 of the cam ring 49 are respectively engaged with the concave grooves 55 of the roller holding part 43 without any rattling in a rotating direction, like the protrusions 58 of the fixed ring roller element 29. Thereby, rotary torque can be transmitted among the roller holding part 43, the ring roller 17 and the cam ring 49.

Also, the cam ring 49 has a notched portion 63 obtained by annularly notching a part of an outer diameter-side and formed on an outer end surface facing the output shaft 13. The notched portion 63 is mounted with the preload spring 45 configured to axially press the cam ring 49.

An end portion of the roller holding part 43 opposite to the base end portion 41 is formed with a ring groove 57 (refer to FIG. 1) on an inner peripheral surface of the end portion along the circumferential direction. In the ring groove 57, the snap ring 53 is fitted. The snap ring 53 is configured to fix the fixed ring roller element 29 to the roller holding part 43 with regulating an axial position.

<Loading Cam Mechanism>

Subsequently, the loading cam mechanism is described.

The moveable ring roller element 31, the cam ring 49 and the ball 51 shown in FIG. 2 configure the loading cam mechanism 23. The loading cam mechanism 23 is configured to increase or decrease pressing forces of the respective rolling-contact surfaces of the sun roller 15, the ring roller 17 and the intermediate roller 19 in proportional to the transmission torque.

Figure 3:
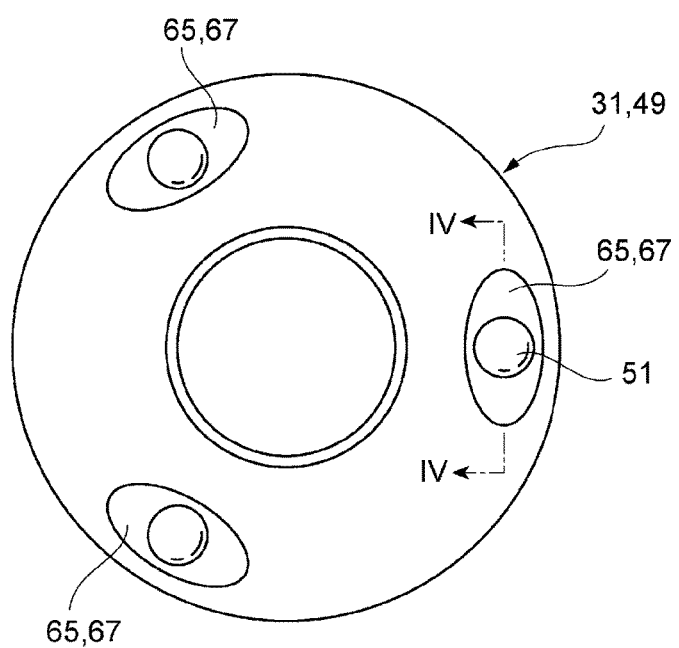
FIG. 3 is a plan view of a moveable ring roller element, depicting cam grooves of a loading cam mechanism.

FIG. 3 is a plan view of the moveable ring roller element 31, depicting cam grooves of the loading cam mechanism 23. In the meantime, shapes and arrangement of the cam grooves shown in FIG. 3 apply to the cam ring 49, too.

The outer end surface 39 of the moveable ring roller element 31 is formed with a plurality of (three, in the shown example) first cam grooves 65 along the circumferential direction. An end surface of the cam ring 49 facing the moveable ring roller element 31 is also formed with second cam grooves 67. That is, a plurality of (three, in the shown example) second cam grooves 67 are formed with facing the first cam grooves 65 at circumferential positions of the cam ring 49 corresponding to the first cam grooves 65 of the moveable ring roller element 31. Each ball 71 is interposed between the first cam groove 65 and the second cam groove 67.

An axial groove depth of each of the first cam groove 65 and the second cam groove 67 is deepest at a central portion in the circumferential direction and becomes gradually shallow toward end portions in the circumferential direction of each of the cam grooves 65, 67.

FIGS. 4A and 4B are sectional views taken along a line IV-V of FIG. 3, in which FIG. 4A is a sectional view depicting a state where the loading cam mechanism 23 shown in FIG. 2 does not generate an axial thrust force, and FIG. 4B is a sectional view depicting a state where the loading cam mechanism 23 shown in FIG. 2 generates an axial thrust force. At a state where torque is not applied to the input shaft 11, each ball 51 is disposed at the deepest portions of the respective cam grooves 65, 67, as shown in FIG. 4A. At this state, the cam ring 49 is pressed toward the moveable ring roller element 31 by an elastic force of the preload spring 45 (refer to FIG. 2).

When torque is applied to the input shaft 11, each ball 51 moves to the shallow portions of the respective cam grooves 65, 67, as shown in FIG. 4B. Thereby, an axial thrust force of pressing the moveable ring roller element 31 toward the fixed ring roller element 29 is generated.

When the loading cam mechanism 23 generates the axial thrust force, the moveable ring roller element 31 shown in FIG. 2 moves toward the fixed ring roller element 29, so that an interval between the fixed ring roller element 29 and the moveable ring roller element 31 decreases. Then, contact positions between the inclined surfaces of the inner peripheral surfaces 29a, 31a of the ring roller 17 and the outer peripheral surface 19a of the convex curved surface of the intermediate roller 19 are changed to conform to elastic deformations of the ring roller 17, the intermediate roller 19 and the sun roller 15, so that surface pressures of the rolling-contact parts of the ring roller 17, the intermediate roller 19 and the sun roller 15 increase, respectively. As a result, as the transmission torque between the input shaft 11 and the output shaft 13 increases, the surface pressures of the rolling-contact parts between the input shaft 11 and the output shaft 13 increase.

As described above, when the loading cam mechanism 23 generates the axial thrust force, the surface pressure of each rolling-contact part increases, so that each roller is elastically deformed. Also, the intermediate roller 19 is displaced toward the fixed ring roller element 29 in association with the axial displacement of the moveable ring roller element 31.

<Support Form of Intermediate Roller with Respect to Carrier>

Figure 5:
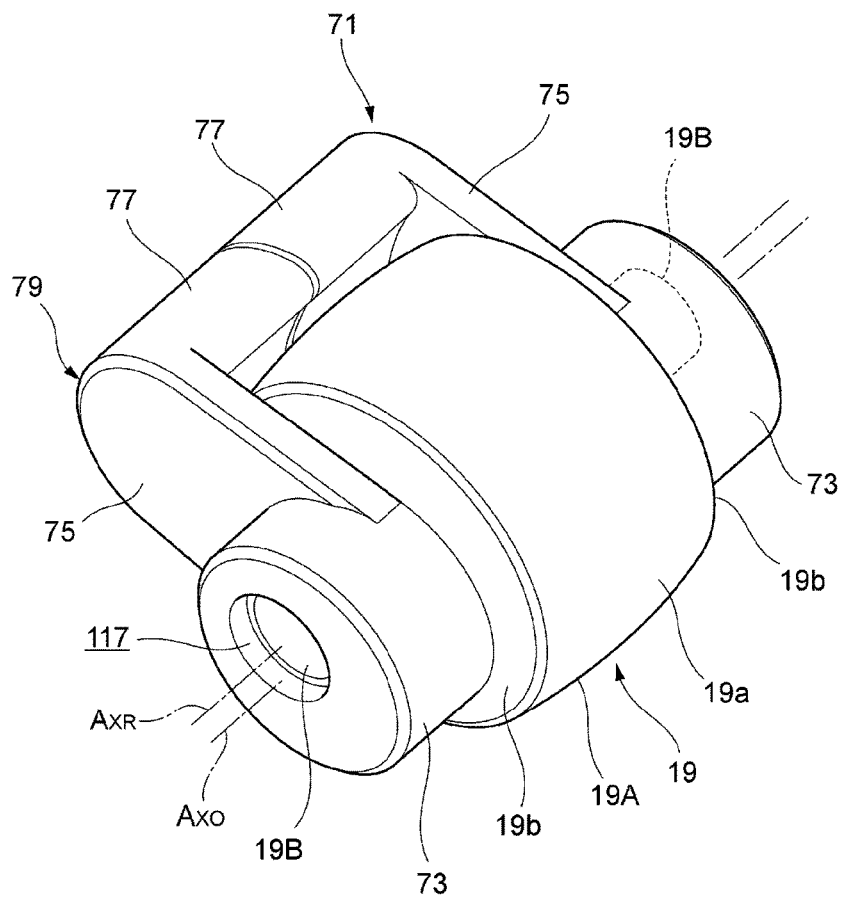
FIG. 5 is an outward perspective view of a pivot holder configured to support an intermediate roller.

Subsequently, a support form of the intermediate roller 19 is described. FIG. 5 is an outward perspective view of the pivot holder 71 configured to support the intermediate roller 19. In below descriptions, the same or corresponding members as or to the above members are denoted with the same reference numerals and the descriptions thereof are simplified or omitted.

The intermediate roller 19 has a roller main body 19A having the outer peripheral surface 19a becoming a traction surface, and a pair of support shafts 19B, 19B extending axially outward from both end surfaces 19b, 19b of the roller main body 19A. The intermediate roller 19 is a solid member of which the roller main body 19A and the pair of support shafts 19B, 19B are integrally formed.

The pair of support shafts 19B, 19B is respectively supported to the pivot holder 71. The pivot holders 71 are independently provided for each of the plurality of intermediate rollers 19, respectively. One intermediate roller 19 is supported to each pivot holder 71. Also, the pivot holder 71 is attached to the carrier 89 (refer to FIG. 1) so that the support shafts 19B, 19B are parallel with the input shaft 11.

The pivot holder 71 has a pair of bearing parts 73, 73 configured to respectively support outer diameter parts of the support shafts 19B, 19B. An outer peripheral surface of each of the bearing parts 73, 73 has a circular axial section, and a circle center (central axis of rotation) of the axial section becomes a pivot center (pivot axis $A_{XO}$) of the pivot holder 71.

The pair of bearing parts 73, 73 has arm parts 75, 75 extending radially outward from inner sides facing the end surfaces 19b of the intermediate roller 19, respectively. The arm parts 75, 75 have connecting posts 77, 77 provided at tip portions opposite to the bearing parts 73, 73, respectively. The connecting posts 77, 77 extend in the axial direction perpendicular to the extension direction of the arm parts 75, respectively, and are fastened to each other by a fixing bolt 113 (refer to FIG. 7) (which will be described later) with tips being butted to each other.

The pair of arm parts 75, 75 and the pair of connecting posts 77, 77 configure a bridging part 79 extending from both end surfaces 19b, 19b of the intermediate roller 19 beyond the outer peripheral surface 19a.

Figure 6:
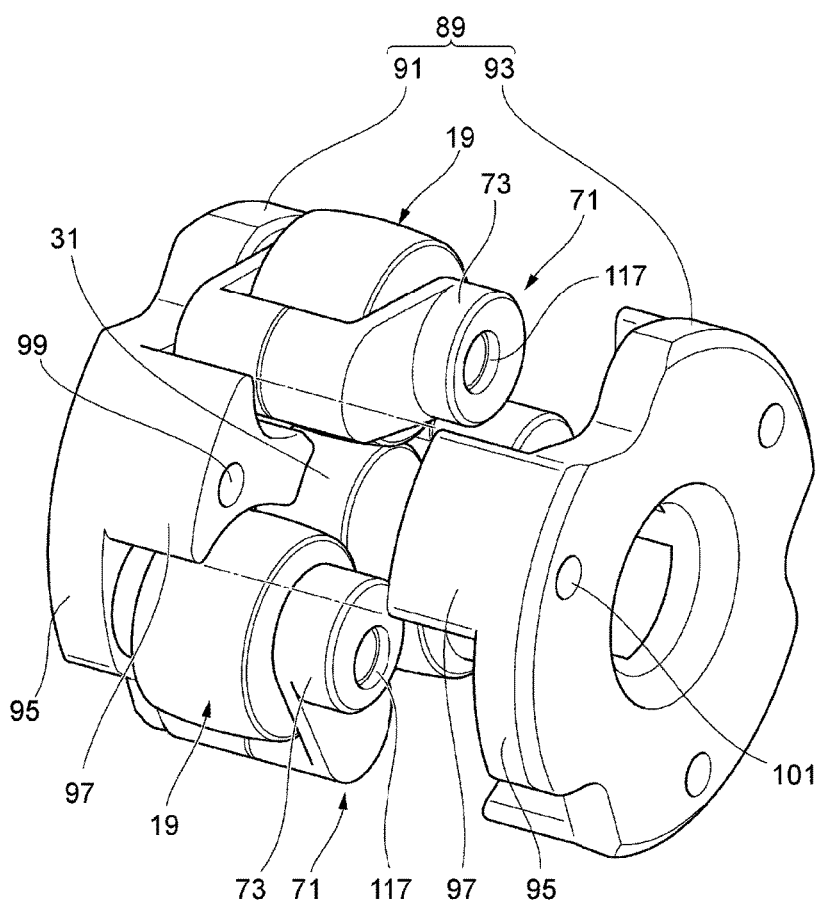
FIG. 6 is an exploded perspective view of a carrier having the intermediate rollers mounted thereto.

FIG. 6 is an exploded perspective view of the carrier 89 having the intermediate rollers mounted thereto. The carrier 89 has a first carrier member 91 and a second carrier member 93. The first carrier member 91 and the second carrier member 93 have a disc-shaped bottom part 95 and pillar parts 97 provided at equal intervals at a plurality of places (three places, in the shown example) in the circumferential direction of the bottom part 95, respectively.

The pillar part 97 of the first carrier member 91 and the pillar part 97 of the second carrier member 93 are formed with insertion holes 99, 101 penetrating therethrough, respectively. A bolt (not shown) is inserted into each of the insertion holes 99, 101. The bolts inserted into the insertion holes 99, 101 fix the carrier 89 to a motor main body (not shown) with corresponding tip portions of the respective pillar parts 97, 97 being butted to each other.

The pivot holder 71 configured to support the intermediate roller 19 is arranged between the pillar parts 97 arranged side by side in the circumferential direction.

Figure 7:
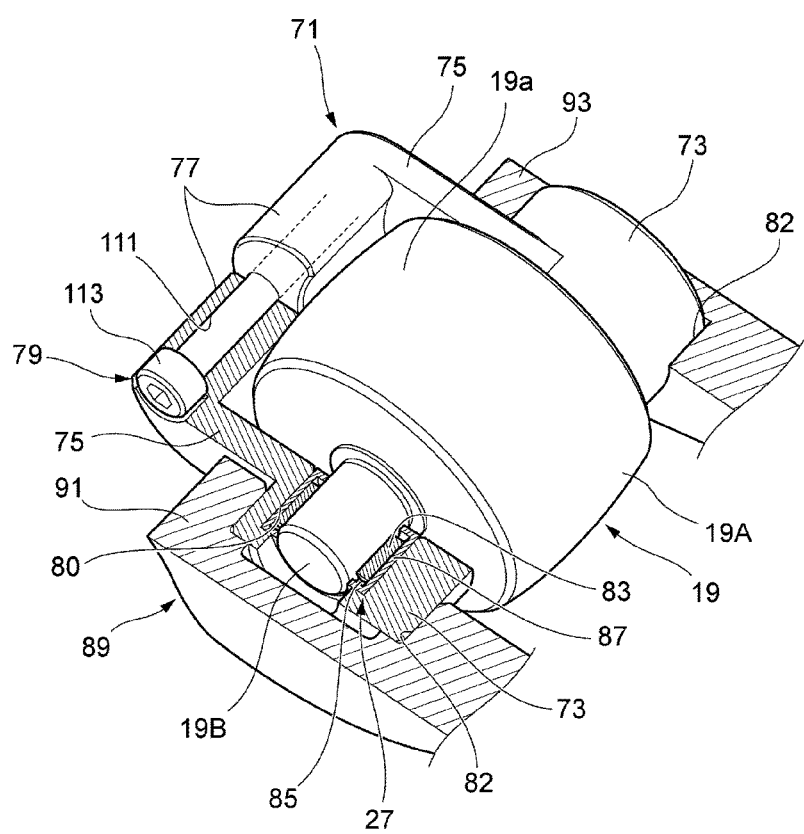
FIG. 7 is a partially sectional perspective view, depicting a support structure of the intermediate roller with a part of the pivot holder and the carrier being cut out.

FIG. 7 is a partially sectional perspective view, depicting a support structure of the intermediate roller 19 with a part of the pivot holder 71 and the carrier 89 being cut out. One bearing part 73 of the pivot holder 71 is rotatably inserted into a holder support part 82 formed in the bottom part 95 (refer to FIG. 6) of the first carrier member 91. The other bearing part 73 is rotatably inserted into a holder support part 82 formed in the bottom part 95 of the second carrier member 93.

The holder support parts 82, 82 are blind holes of which one end portion is closed, and are coaxially formed, respectively.

The bearing part 73 of the pivot holder 71 inserted into the holder support part 82 has substantially the same outer diameter as an inner diameter of the holder support part 82, and is configured to rotate as an outer peripheral surface of the bearing part 73 and an inner peripheral surface of the holder support part 82 slide relative to each other. Thereby, the pivot holder 71 is supported to the carrier 89 so that it can be freely pivotable.

The pair of support shafts 19B of the intermediate roller 19 is pivotally supported to support holes 80 of the bearing parts 73 via needle bearings 27. The needle bearing 27 is a shell-type or solid-type needle bearing having a needle roller 83, a retainer 85 and an outer ring 87. The needle bearing 27 is configured to support the intermediate roller 19 to be rotatable and to be freely moveable in the axial direction. In the meantime, a ball bearing may be used instead of the needle bearing 27.

The arm part 75 and the connecting post 77 extending from each of the bearing parts 73, 73 are fastened by a fixing bolt 113 inserted into a fixing hole 111 formed in the connecting post 77. Thereby, the pair of bearing parts 73, 73, the pair of arm parts 75, 75 and the pair of connecting posts 77, 77 are integrated. In the meantime, a pin may be forcibly inserted instead of the fixing bolt 113.

The bridging part 79 having the above configuration is configured to integrally couple the pair of bearing parts 73, 73 and to suppress the bearing parts 73, 73 from being relatively distorted. The bridging part 79 is formed over the outer peripheral surface 19a at the radially outer side of the outer peripheral surface 19a of the intermediate roller 19, so that it is possible to suppress the torsion generated at the bearing parts 73, 73 with a small force.

<Relation Between Radius of Bearing Part and Eccentricity Amount>

Figure 8:
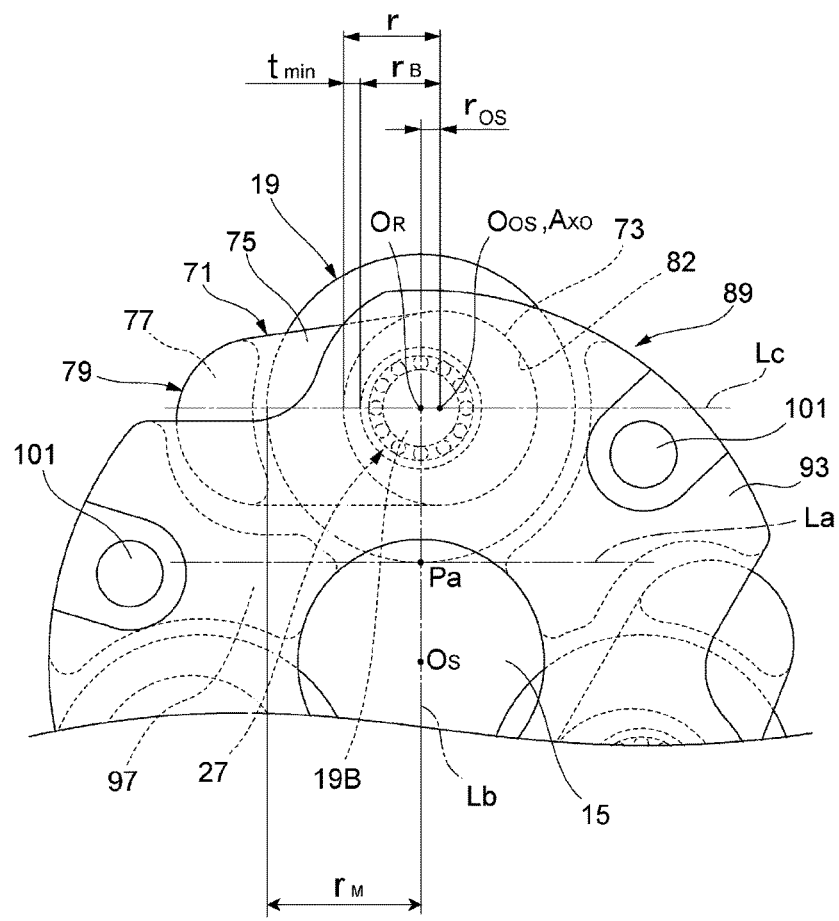
FIG. 8 is a side view of the carrier.

FIG. 8 is a side view of the carrier 89. In the shown example, the bearing part 73 of the pivot holder 71 is inserted into the holder support part 82 of the second carrier member 93, and the intermediate roller 19 is in contact with the sun roller 15.

Herein, a normal line at a contact point $P_a$ of the sun roller 15 and the intermediate roller 19, which passes a center $O_S$ of the sun roller 15, is denoted as a virtual line $L_b$. The virtual line $L_b$ is a line perpendicular to a tangential line $L_a$ at the contact point $P_a$.

At a reference state before the pivot holder 71 is pivoted, a center $O_R$ of the support shaft 19B is located on the virtual line $L_b$. A pivot center $O_{OS}$, which is a center of the shaft hole of the holder support part 82, is located at a position distant from the center $O_R$ of the support shaft 19B at the reference state and on a line $L_C$ parallel with the tangential line $L_a$.

Figure 9:
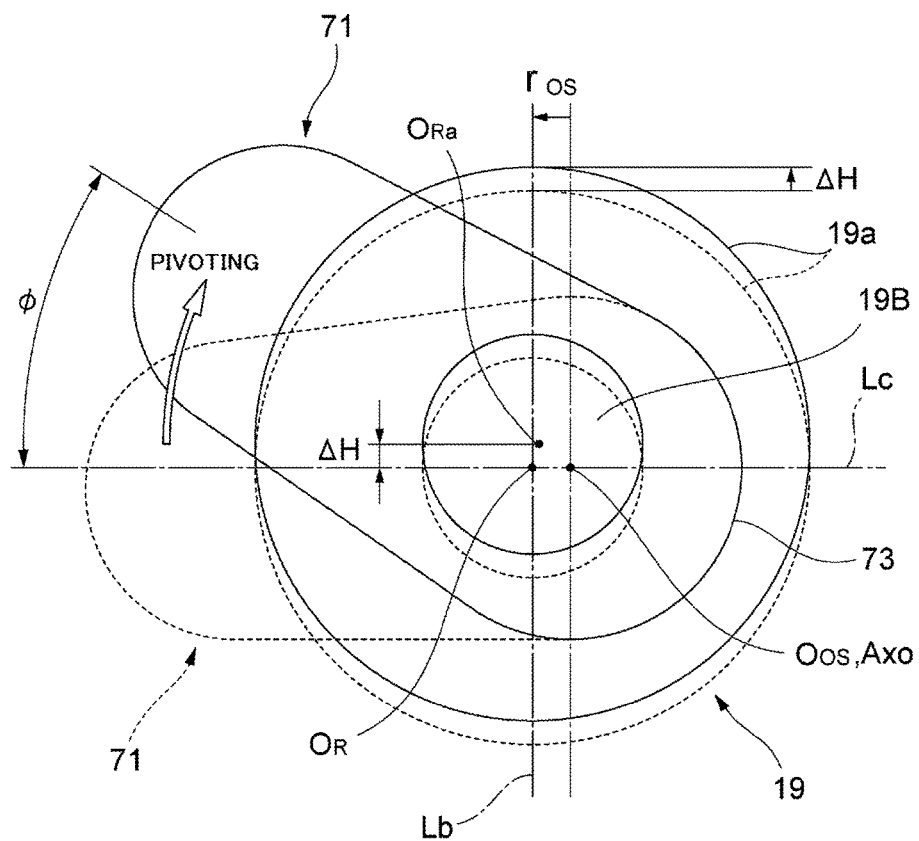
FIG. 9 pictorially illustrates a reference state of the pivot holder and the intermediate roller and a state after pivoting.

FIG. 9 pictorially depicts the reference state of the pivot holder 71 and the intermediate roller 19 and a state after the pivoting. At the reference state shown with the dotted line, the pivot holder 71 is configured so that the center $O_R$ of the support shaft 19B is located on the line $L_C$ and an interaxial distance between the center $O_R$ on the line $L_C$ and the pivot center $O_{OS}$ is an eccentricity amount $r_{OS}$ by which the pivot holder 71 pivots.

When the pivot holder 71 rotates (pivots) about the pivot center $O_{OS}$ by an angle φ, the center $O_R$ of the support shaft 19B is spaced from the line $L_C$ and moves to a position denoted with a center $O_{Ra}$. That is, the center $O_{Ra}$ moves in a direction of the virtual line $L_b$ by a distance ΔH, so that a position of the outer peripheral surface 19a of the intermediate roller 19 is displaced by the distance ΔH. Therefore, the intermediate roller 19 protrudes in a radially outward direction of the carrier 89.

As described above, when the bearing parts 73 of the pivot holder 71 slide in the holder support parts 82 of the carrier 89 shown in FIGS. 7 and 8 and the pivot holder 71 is inclined by the angle 4, the intermediate roller 19 is radially displaced by the distance ΔH. Also, when the pivot holder 71 changes by an inclination angle of the opposite direction to the shown example, the intermediate roller 19 is displaced in the opposite direction to the shown example. Thereby, the intermediate roller 19 can freely appear in the radial direction of the carrier 89 in correspondence to the transmission torque of the reduction gear.

A radius r of the bearing part 73 of which a central axis of rotation is the pivot axis $A_{XO}$ is obtained by a following equation (1).

$$r \geq r_{OS} + r_0 + t_{min} \quad (1)$$

Herein, $r_{OS}$: an eccentricity amount. In FIG. 8, on the basis of the virtual line $L_b$, an eccentricity amount of an opposite side (a right side in FIG. 8) to the bridging part 79-side is referred to as a positive eccentricity amount, and an eccentricity amount of a side (a left side in FIG. 8) at which the bridging part 79 exists is referred to as a negative eccentricity amount.

$r_B$: a radius of the needle bearing 27 and an inner peripheral surface radius of the support hole 80 (refer to FIG. 7) of the bearing part 73 configured to support the support shaft 19B.

$t_{min}$: a radial minimum thickness of the bearing part 73.

In the meantime, the radial minimum thickness $t_{min}$ is a minimum thickness of the bearing part 73 necessary to securely hold the bearing under using environments.

When an outer diameter (2r) of the bearing part 73 is greater than an outer diameter ($2r_M$) of the intermediate roller 19, it is necessary to axially enlarge the pivot holder 71 so as to avoid interference with the sun roller and the ring roller. For this reason, the outer diameter (2r) of the bearing part 73 is preferably smaller than the outer diameter ($2r_M$) of the intermediate roller 19. Therefore, $r_{OS}$ in the equation (1) is preferably set to satisfy a relation of an equation (2).

$$r_{OS} < r_M - (r_B + t_{min}) \quad (2)$$

That is, the eccentricity amount $r_{OS}$, which is the interaxial distance between the pivot center $O_{OS}$, which is a center of rotation of the bearing part 73, and the center $O_R$ of the rotational shaft, is made shorter than a length, which is to be obtained by subtracting a sum of the inner peripheral surface radius $r_B$ of the support hole 80 (refer to FIG. 7) of the bearing part 73 configured to support the support shaft 19B and the radial minimum thickness $t_{min}$ of the bearing part 73 from the radius $r_M$ of the intermediate roller 19. Thereby, it is possible to make an arrangement in which the bearing part 73 does not interfere with the sun roller and the ring roller and space efficiency is improved.

That is, the eccentricity amount $r_{OS}$, which is the interaxial distance between the center $O_R$ and the pivot center $O_{OS}$, is set to be equal to or smaller than the maximum radius $R_M$ of the outer diameter of the intermediate roller 19, so that it is possible to implement a more compact layout without any interference between the pivot holder 71 and the respective members.

Figure 15:
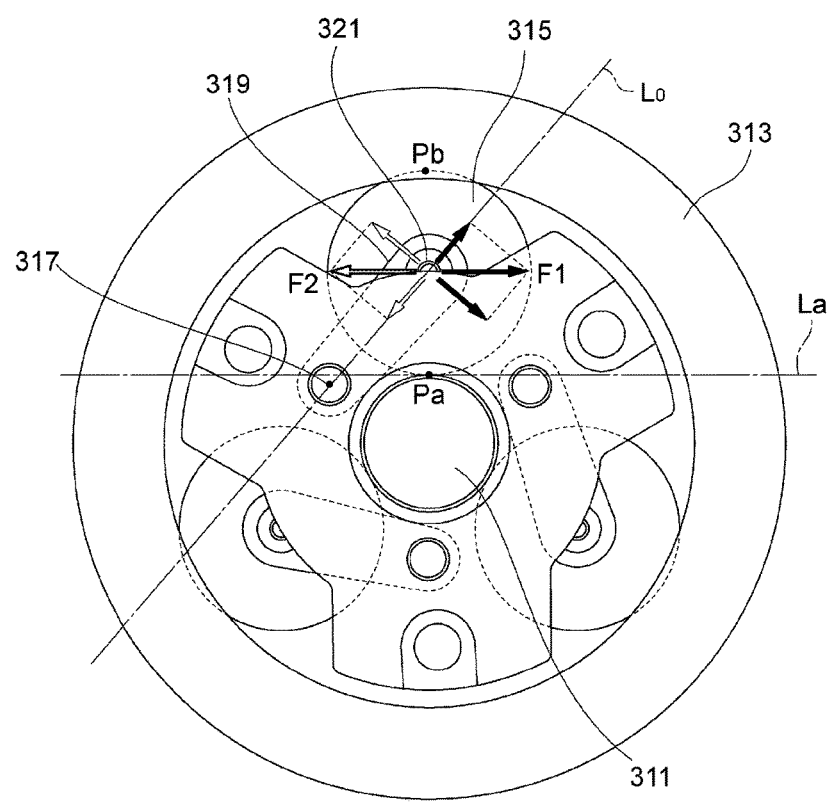
FIG. 15 is a configuration view of main parts of a reduction gear, depicting an arrangement relation of a sun roller, a ring roller and intermediate rollers of the related art.

Also, the pivot center $O_{OS}$ is located on the line $L_C$. The line $L_C$ indicates a direction in which the tangential forces F1, F2 shown in FIG. 15 are applied, and is an applying line of the torque reaction force of the transmission torque to be applied to the pivot holder 71. In this configuration, since the pivot center $O_{OS}$ is located on the line $L_C$, even when the torque reaction force is applied to the pivot holder 71, the rotational moment is not applied to the pivot holder 71. That is, a configuration where the component force of the torque reaction force is not generated is made. Therefore, the intermediate roller 19, the sun roller 15 and the ring roller 17 are not influenced by the component force of the torque reaction force, and inequality of the contact surface pressures of the respective contact points is suppressed. Also, the reduction gear can realize stable power transmission characteristics, irrespective of operation conditions such as a torque transmission direction.

<Arrangement Relation of Bridging Part and Pivot Axis>

In an assembling process of the friction-roller-type reduction gear 100, the sun roller 15 shown in FIG. 1 is inserted along the central axis of the carrier 89 from the axial end surface of the carrier 89. Since the outer edge shape of the axial end surface of the sun roller 15 is the concave curved surface, when inserting the sun roller 15, the intermediate rollers 19 mounted to the carrier 89 are temporarily retreated toward the outer diameter-side.

When the intermediate roller 19 is retreated, the pivot holder 71 configured to support the intermediate roller 19 is also pivoted about the pivot axis $A_{XO}$, as shown in FIG. 8. For this reason, in order to prevent the pivoting pivot holder 71 and the intermediate roller 19 from interfering with the carrier 89, it is necessary to narrow a radial section of the pillar part 97 provided for the carrier 89. In this case, the stiffness of the carrier 89 is lowered and a degree of design freedom in the pillar part 97 is also lowered.

Also, the pivot center of the pivot holder 71 is located at a position deviating from the tangential line direction of the roller contact point and the component force of the tangential force is applied to the contact point of the roller. For this reason, inequality occurs between a normal force of the sun roller contact point and a normal force of the ring roller contact point. This inequality can be solved by the structure where the eccentricity amount $r_{OS}$, which is the interaxial distance between the pivot axis of the pivot holder 71 and the intermediate roller 19, is set in accordance with the equation (2). That is, the pivot axis is made to face toward the tangential line direction of the roller contact point, so that it is possible to balance the normal forces.

However, when the eccentricity amount $r_{OS}$ is small, a pivoting angle, which is necessary to retreat the intermediate roller 19 during the assembling process of the friction-roller-type reduction gear 100, increases and the radial section of the pillar part 97 decreases.

Therefore, in the friction-roller-type reduction gear 100 of this configuration, the bridging part 79 and the pivot center $O_{OS}$ are arranged as shown in FIG. 8. That is, on the basis of the virtual line $L_b$ passing the centers of the intermediate roller 19 and the sun roller 15, one side (a left side in FIG. 8) of the virtual line $L_b$ is set as a side at which the bridging part 79 of the pivot holder 71 is to be arranged and the other side (a right side in FIG. 8) is set as a side at which the pivot center $O_{OS}$ is to be arranged.

FIGS. 10A and 10B depict a relation between the pillar parts 97 of the first carrier member 91 (also, the second carrier member 93) and the bridging parts 79 of the pivot holders 71, in which FIG. 10A is a sectional view illustrating a state where the intermediate rollers 19 are in contact with the sun roller 15, and FIG. 10B is a sectional view illustrating a state where the pivot holders 71 are pivoted to move the intermediate rollers 19 toward the outer diameter-side of the sun roller 15.

During the assembling process of the friction-roller-type reduction gear 100, when inserting the sun roller 15 into the carrier 89, the intermediate rollers 19 are temporarily retreated toward the outer diameter-side from the state of FIG. 10A to the state of FIG. 10B. At this time, the bridging part 79 is rotated toward the outer diameter-side about the pivot center $O_{OS}$ by an angle $\phi_{OUT}$, so that the intermediate roller 19 is moved toward the outer diameter-side.

In this way, the bridging part 79 is moved toward the outer diameter-side, so that the interference between the bridging part 79 and the pillar part 97 of the carrier 89 is reduced and the radial section of the pillar part 97 is enlarged. As a result, it is possible to improve the stiffness of the carrier 89. Also, the pillar part 97 is formed with an oil passage (which will be described later) and the insertion holes 99, 101 for attachment (refer to FIG. 6), so that lubricant oil is supplied from the carrier 89 to each roller and bearing through the oil passage. When forming the oil passage, the greater the radial section of the pillar part 97 is, a degree of design freedom increases. Also, when forming a plurality of oil passages, it is possible to widen an interval between the oil passages, so that workability is improved.

Subsequently, operations of the pivot holder 71 during the rotation are described.

As shown in FIGS. 1 and 2, according to the friction-roller-type reduction gear 100 having the configuration where the loading cam mechanism 23 is provided for only one moveable ring roller element 31 of the pair of ring roller elements 29, 31, the normal force is applied to both the rolling-contact surfaces by the loading cam mechanism 23, in correspondence to the contact angle between the moveable ring roller element 31 and the intermediate roller 19.

By the obtained normal force, the intermediate rollers 19 are pressed by the sun roller 15 and are moved toward the inner diameter-side by the elastic deformations of the respective parts thereof. Also, as described with reference to FIGS. 10A and 10B, the bridging parts 79 of the pivot holders 71 are moved toward the inner diameter-side.

That is, according to the friction-roller-type reduction gear 100 having the above configuration, when the loading cam mechanism 23 operates, the bridging parts 79 are moved toward the inner diameter-side. A moving amount of the intermediate roller 19 toward the inner diameter-side is a sum of elastic deformation amounts of the intermediate roller 19 and the sun roller 15 and an elastic deformation amount of the rolling-contact surface, and is very small, as compared to the retreat amount toward the outer diameter-side during the assembling process. Since the moving amount of the intermediate roller 19 is small, a moving amount of the bridging part 79 toward the inner diameter-side is also smaller than the moving amount during the assembling process.

Therefore, the bridging part 79 is made to move toward the outer diameter-side during the assembling process in which the moving amount of the bridging part 79 is great, so that it is possible to suppress the interference between the pillar part 97 and the bridging part 79 to the minimum. Thereby, it is possible to improve the stiffness of the pillar part 97 and the degree of design freedom.

Herein, a pivot holder $71_{ref}$ having another structure is described for comparison with the pivot holder 71 having the above configuration.

FIGS. 11A and 11B are reference views depicting a relation between pillar parts $97_{ref}$ of the carrier and bridging parts $79_{ref}$ of the pivot holders $71_{ref}$, in which FIG. 11A is a sectional view illustrating a state where the intermediate rollers 19 are in contact with the sun roller 15, and FIG. 11B is a sectional view illustrating a state where the pivot holders $71_{ref}$ are pivoted to move the intermediate rollers 19 toward the outer diameter-side of the sun roller 15.

As shown in FIG. 11A, according to the configuration for comparison, on the basis of the virtual line $L_b$ passing the centers of the intermediate roller 19 and the sun roller 15, both the bridging part $79_{ref}$ of the pivot holder $71_{ref}$ and the pivot center $O_{OS}$ are arranged at one side (a left side in FIG. 11A of the virtual line $L_b$.

In this case, as shown in FIG. 11B, during the assembling process, in order to retreat the intermediate roller 19 toward the outer diameter-side, the bridging part $79_{ref}$ of the pivot holder $71_{ref}$ is largely moved toward the inner diameter-side. When the bridging part $79_{ref}$ is largely moved toward the inner diameter-side, it is necessary to narrow the axial section of the pillar part $97_{ref}$ so as to prevent the interference between the pillar part $97_{ref}$ and the bridging part $79_{ref}$. As a result, the stiffness of the carrier and the degree of design freedom in the pillar part $97_{ref}$ are lowered.

<Axial Displacement of Intermediate Roller>

Subsequently, the axial displacement of the intermediate roller 19 is described.

As shown in FIGS. 1 and 2, according to the friction-roller-type reduction gear 100 having the above configuration, the loading cam mechanism 23 is arranged only at the axially outer side of one of the ring roller elements 29, 31. The loading cam mechanism 23 is configured to displace the moveable ring roller element 31 toward the fixed ring roller element 29, in correspondence to the rotary torque from the input shaft 11. Thereby, an axial force is applied to the intermediate roller 19.

The intermediate roller 19 is applied with the axial force and axially slides. The sliding operation is implemented by the needle bearing 27 shown in FIG. 7. The needle bearing 27 enables the smooth sliding operation with a low resistance without interfering with the axial displacement of the intermediate roller 19. Thereby, when the intermediate roller 19 is applied with the axial force from the loading cam mechanism 23, the intermediate roller smoothly slides to suppress wear and friction.

In the meantime, the intermediate roller 19 is supported to the pivot holder 71 so that it can axially move. Between the one and other end surfaces 19b of the roller main body 19A and the holder inner surfaces of the pivot holder 71, i.e., between the end surfaces 19b and the facing inner surfaces of the pair of arm parts 75, 75, gaps δ (refer to FIG. 2) are respectively formed. By the gaps δ, the intermediate roller 19 can axially move.

<Oil Supply Passage to Support Bearing of Intermediate Roller>

Subsequently, an oil supply passage for supplying the lubricant oil to the support bearing of the intermediate roller 19 is described.

Figure 12:
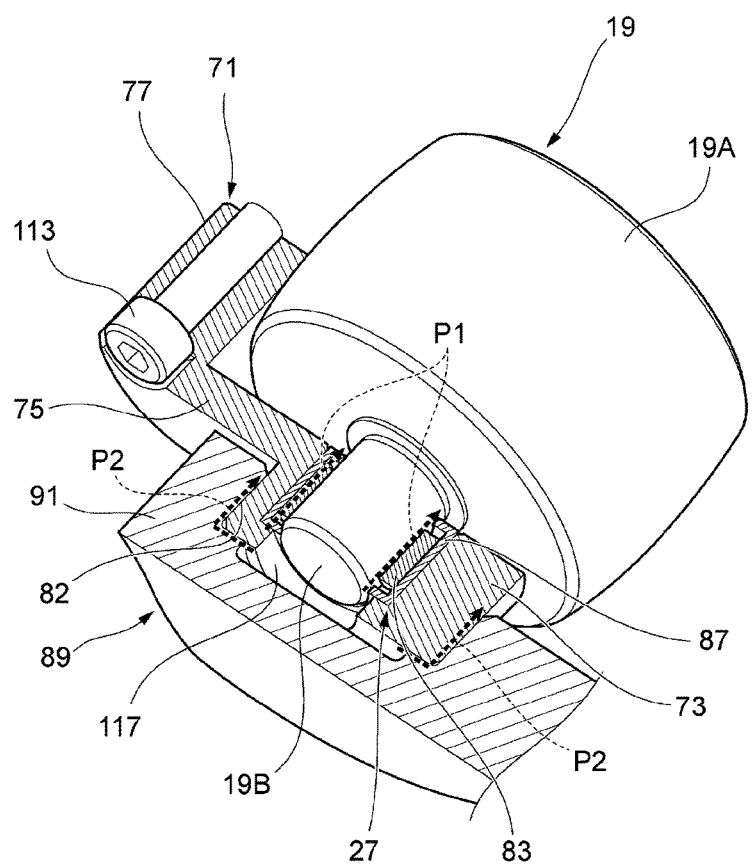
FIG. 12 is a partially sectional perspective view of the pivot holder and the carrier configured to support the pivot holder.

FIG. 12 is a partially sectional perspective view of the pivot holder 71 and the carrier 89 configured to support the same. Although not shown, the carrier 89 is formed therein with an oil passage configured to communicate with the holder support part 82. Through the oil passage, the lubricant oil is supplied to the holder support part 82.

The bearing part 73 of the pivot holder 71 is formed on its axial outer end surface with an opening hole 117 for exposing the end surface of the support shaft 19B. Through the opening hole 117, the lubricant oil in the holder support part 82 is supplied to the needle bearing 27 (refer to an arrow P1 in FIG. 12). Also, the lubricant oil supplied into the opening hole 117 is supplied between the inner peripheral surface of the holder support part 82 and the outer peripheral surface of the bearing part 73 (refer to an arrow P2 in FIG. 12), so that the lubricant oil to the pivot axis is secured.

Modified Embodiment of Intermediate Roller and Pivot Holder

Figure 13:
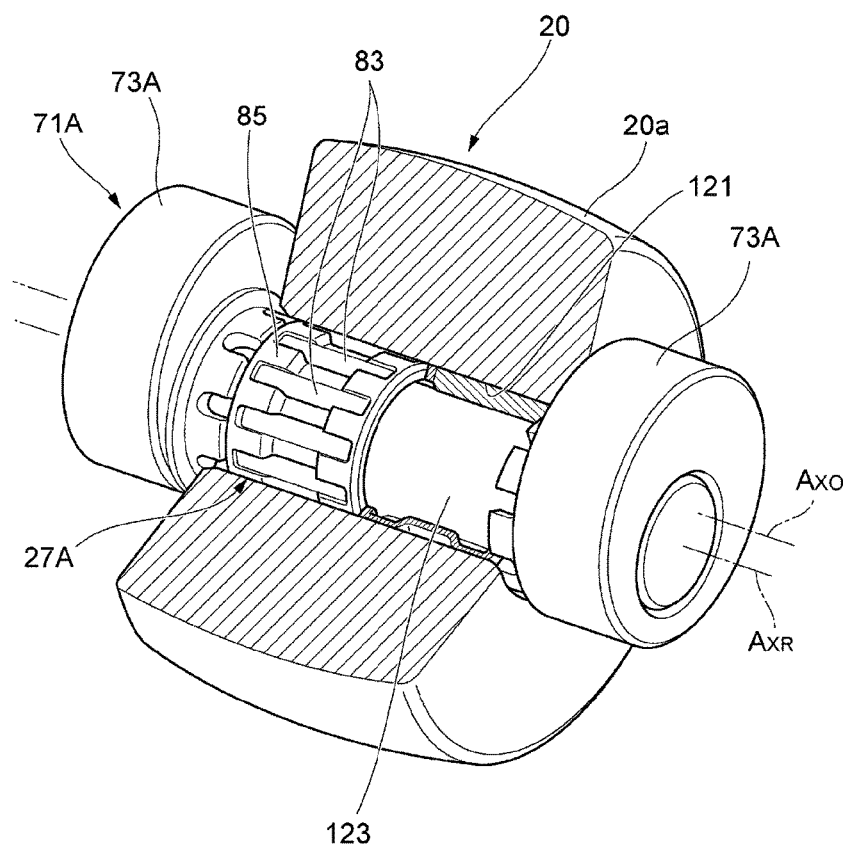
FIG. 13 is a partially sectional perspective view depicting a configuration of a modified embodiment of the intermediate roller and the pivot holder.

In the below, a modified embodiment of the intermediate roller and the pivot holder is described. FIG. 13 is a partially sectional perspective view depicting a configuration of a modified embodiment of the intermediate roller and the pivot holder.

An intermediate roller 20 has a traction surface on an outer peripheral surface 20a and is formed with a shaft hole 121 penetrating an inner diameter part thereof. A shaft-shaped bridging part 123 is inserted into the shaft hole 121 via needle bearings 27A. The needle bearing 27A is a cage & roller having the needle roller 83 and the retainer 85. In this configuration, the needle bearings are axially arranged in two rows.

Bearing parts 73A, 73A are respectively fixed to both end portions of the bridging part 123. The bearing parts 73A, 73A have an outer peripheral surface of which an axial section is circular and central axes of rotation thereof become a pivot axis $A_{XO}$. Also, a central axis $A_{XR}$ of the bridging part 123 is arranged at an eccentric position from the pivot axis $A_{XO}$.

According to the above configuration, the bearing parts 73A, 73A are coupled by the bridging part 123, so that the same effects as the pivot holder 71 are achieved. Also, since this configuration is a structure where the bridging part 123 penetrates the inner diameter part of the intermediate roller 20, a space of the outer diameter-side of the intermediate roller 20 is not required. For this reason, the support structure of the intermediate roller 20 having the above configuration can be applied to a reduction gear having a large speed reduction ratio and a small clearance between the intermediate rollers 20, too.

Modified Embodiment of Carrier

Figure 14:
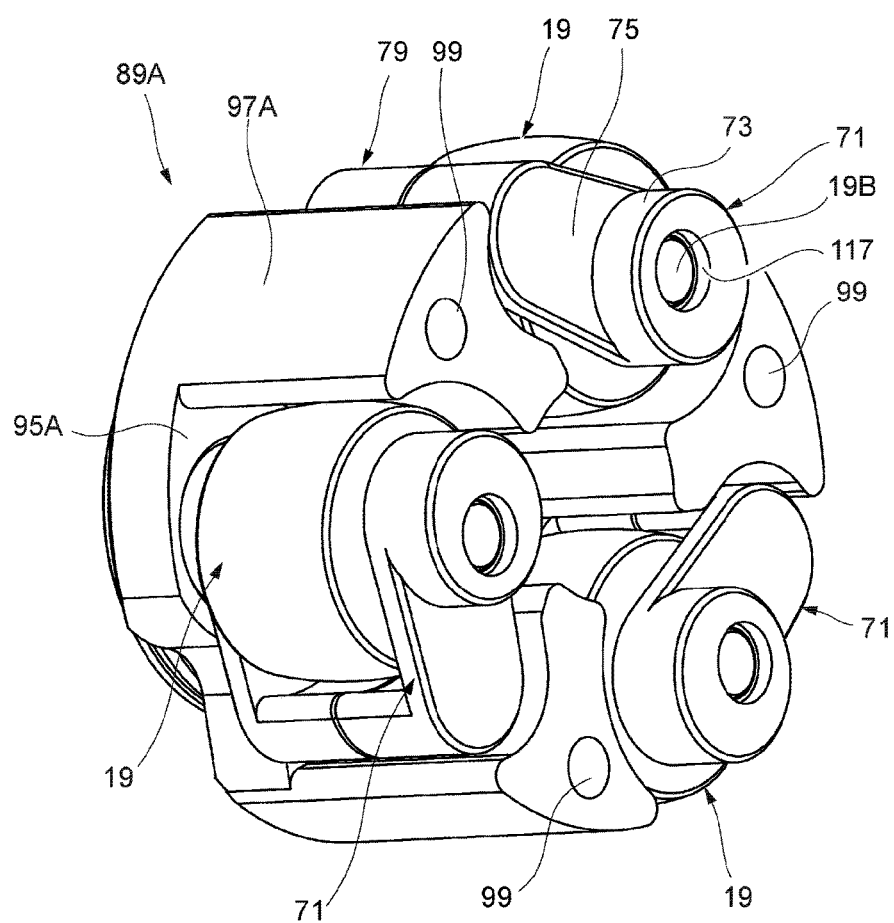
FIG. 14 is a perspective view depicting a configuration of a modified embodiment of the carrier having the intermediate rollers mounted thereto.

FIG. 14 is a perspective view depicting a modified embodiment of the carrier having the intermediate rollers mounted thereto. According to a carrier 89A of the modified embodiment, the pillar parts 97, which are to be provided for each of the first carrier member 91 and the second carrier member 93 shown in FIG. 6, are provided only for one carrier member. Also, the other carrier member (not shown) has only the bottom part 95. The other configurations are the same as the above.

According to the carrier 89A having the above configuration, the pillar part 97A is integrally configured without being split. For this reason, it is possible to easily process the pillar part 97A and to increase the size precision, as compared to the pillar part configured by a combination of the two components.

According to the friction-roller-type reduction gear 100 as described above, it is possible to achieve following effects by the support structure of the intermediate roller 19.

As shown in FIG. 5, the pivot holder 71 has the bearing parts 73, 73 provided at both sides of the roller main body 19A of the intermediate roller 19. The central axes of rotation of the bearing parts 73, 73 become the pivot axis $A_{XO}$ eccentric from the central axis $A_{XR}$ of the support shaft 19B. Also, the pair of bearing parts 73, 73 is coupled by the bridging part 79 and is thus integrated.

By the above configuration, it is possible to arrange the pivot axis $A_{XO}$ at the more radially inner side than the outer peripheral surface of the intermediate roller 19, so that it is possible to improve the degree of layout freedom of the pivot axis $A_{XO}$. Also, since the support shafts 19B of the intermediate roller 19 and the pivot axis $A_{XO}$ are all arranged in the inner regions of the outer diameters of the bearing parts 73, 73, it is possible to shorten the axial size of the part configured to support each roller, so that it is possible to make the reduction gear further smaller. The relative distortion between the bearing parts 73, 73 is suppressed by the bridging part 79, so that it is possible to stably keep a posture of the intermediate roller 19 all the time.

Therefore, according to the above configuration, it is possible to improve the degree of design freedom of the carrier and the degree of freedom of arrangement layout of the diverse rollers. Also, as compared to the pivot holder of the related art shown in FIG. 15, since the distance between the central axis $A_{XR}$ of the support shaft 19B and the pivot axis $A_{XO}$ is shorter, the elastic deformation amount of the arm parts 75 of the pivot holder 71 upon the reduction gear operation is reduced, so that a behavior of the roller is easily stabilized.

Figure 16:
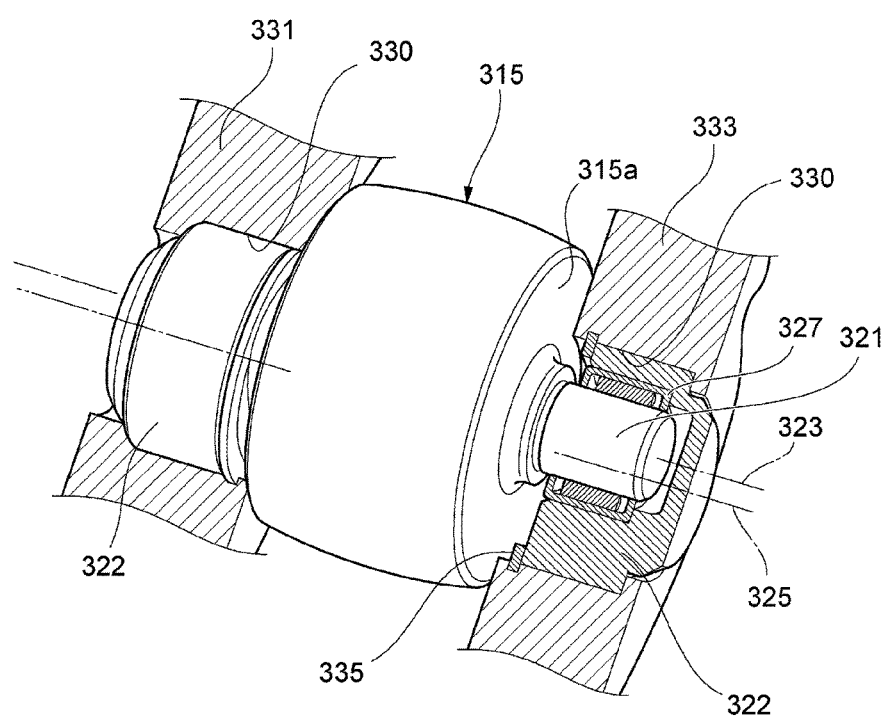
FIG. 16 illustrates a configuration of the related art in which a pivot axis is provided for outer diameter parts of bearing parts configured to the intermediate roller at an eccentric position from a roller rotation axis.

Also, according to the pivot holder of the related art shown in FIG. 16, the intermediate roller 19 is supported to one frame 331 and the other frame 333, which are independent of each other. In this case, it is necessary to keep the axial positions of the bearing parts 322 at fixed positions of the respective frames 331, 333. Therefore, in the shown example, the bearing part 322 is positioned using the snap ring 335. However, this support form increases the number of components, the processing man-hour and the size of the reduction gear.

On the other hand, according to the above configuration, since the pair of bearing parts 73, 73 is coupled by the bridging part 79, it is not necessary to axially position the respective bearing parts 73, 73 at the carrier 89. For this reason, it is possible to make a simpler structure.

The present invention is not limited to the above embodiment, and combinations of the respective configurations of the embodiment and changes and modifications, which can be made on the basis of the specification and the well-known technology by one skilled in the art, are also expected by the present invention and are included within the protection scope.

The present invention is based on a Japanese Patent Application No. 2015-81888 filed on Apr. 13, 2015, a Japanese Patent Application No. 2015-135442 filed on Jul. 6, 2015 and a Japanese Patent Application No. 2016-55717 filed on Mar. 18, 2016, which are herein incorporated by reference.

DESCRIPTION OF REFERENCE NUMERALS

11: input shaft, 13: output shaft, 15: sun roller, 15*a*: outer peripheral surface, 17: ring roller, 17*a*: inner peripheral surface, 19, 20: intermediate roller, 19*a*, 20*a*: outer peripheral surface, 19A: roller main body, 19B: support shaft (rotational shaft), 23: loading cam mechanism, 27: needle bearing, 71: pivot holder, 73: bearing part, 79: bridging part, 82: holder support part, 89: carrier, 100: friction-roller-type reduction gear

The invention claimed is:

1. A friction-roller-type reduction gear comprising:
a sun roller arranged concentrically with an input shaft;
a ring roller arranged concentrically with the sun roller at an outer periphery-side of the sun roller and coupled to an output shaft;
a plurality of intermediate rollers configured to rolling-contact an outer peripheral surface of the sun roller and an inner peripheral surface of the ring roller;
a plurality of pivot holders each of which is provided for each of the plurality of intermediate rollers and is configured to support a rotational shaft of the intermediate roller;
a carrier configured to support the plurality of pivot holders, respectively, and
a loading cam mechanism configured to apply a pressing force, which is proportional to a magnitude of transmission torque to be applied to rolling-contact surfaces between respective rollers of the sun roller, the ring roller and the intermediate rollers, to the rolling-contact surfaces,
wherein each of the pivot holders comprises:
a pair of bearing parts configured to support the rotational shaft of the intermediate roller and having a pivot center at an eccentric position from a center of the rotational shaft, and
a bridging part configured to integrally couple the bearing parts,
wherein the carrier has holder support parts configured to rotatably support the bearing parts,
wherein an interaxial distance between the pivot center of the bearing part and the center of the rotational shaft is equal to or smaller than a maximum radius of an outer diameter of the intermediate roller, and
wherein the pivot center is located on an applying line of a torque reaction force of transmission torque to be applied to the pivot holder.

2. The friction-roller-type reduction gear according to claim 1,
wherein the interaxial distance between the center of the pivot axis and the center of the rotational shaft is smaller than a length, which is to be obtained by subtracting a sum of an inner peripheral surface radius of the holder support part configured to support the rotational shaft and a radial minimum thickness of the bearing part from a radius of the intermediate roller.

3. The friction-roller-type reduction gear according to claim 1,
wherein the bridging part is arranged over an outer peripheral surface of the intermediate roller from both end surfaces of the intermediate roller.

4. The friction-roller-type reduction gear according claim 1,
wherein the rotational shaft of the intermediate roller is inserted into a shaft hole axially penetrating an inner diameter part, and
wherein the bearing parts are respectively fixed to both end portions of the rotational shaft, so that the bridging part is configured.

* * * * *